Figure 5:
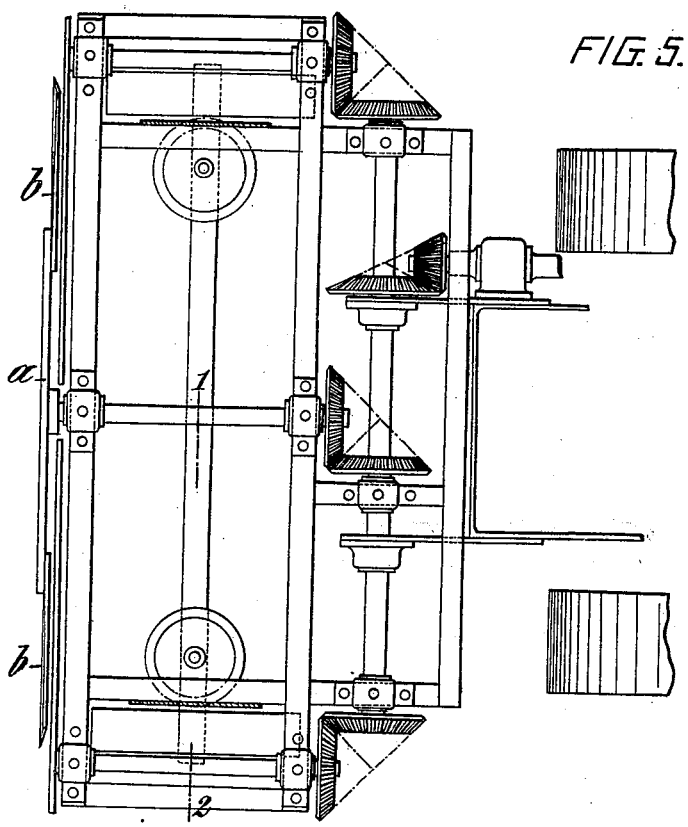

No. 658,460. Patented Sept. 25, 1900.
B. P. NUBAR.
MACHINE FOR PLOWING AND CULTIVATING.
(Application filed Mar. 4, 1899.)
(No Model.) 5 Sheets—Sheet 1.
FIG. 1.
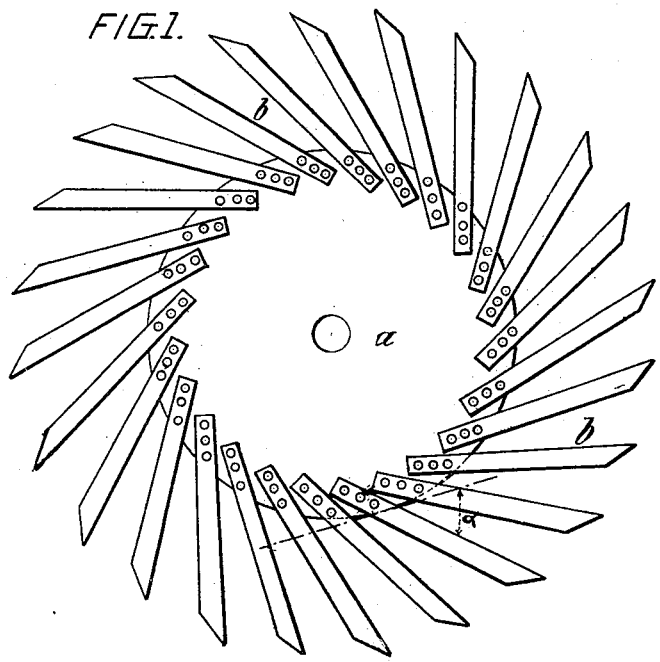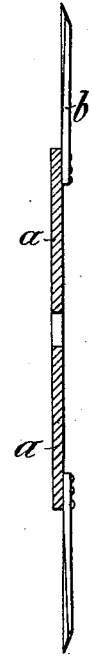
FIG. 2.
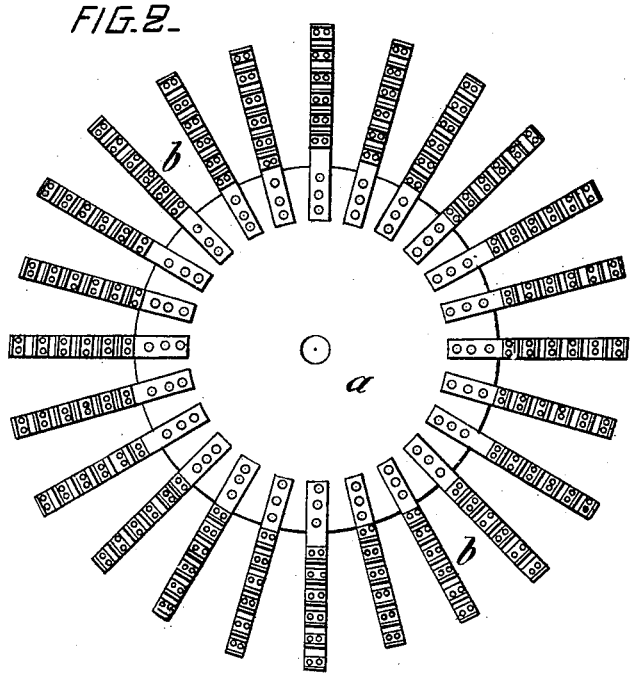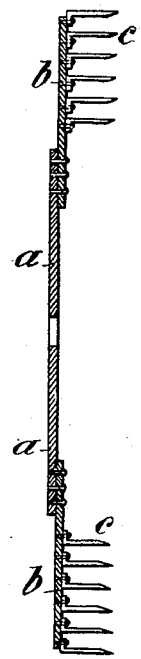
Witnesses
R. Aberli
Charles E. Smith
Inventor
Boghos Pacha Nubar
By Briesen & Knauth
his Attorneys
THE NORRIS PETERS CO., PHOTO-LITHO., WASHINGTON, D. C.

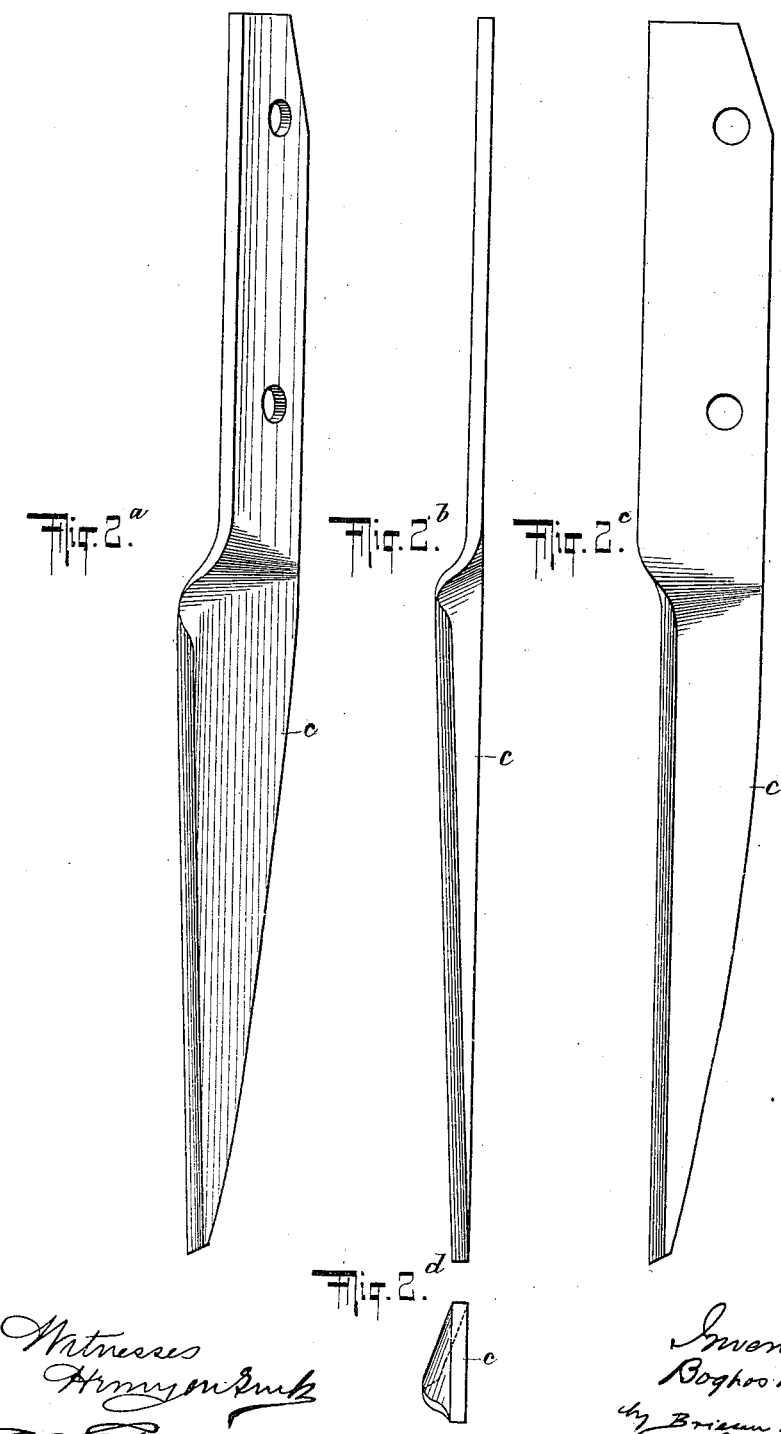

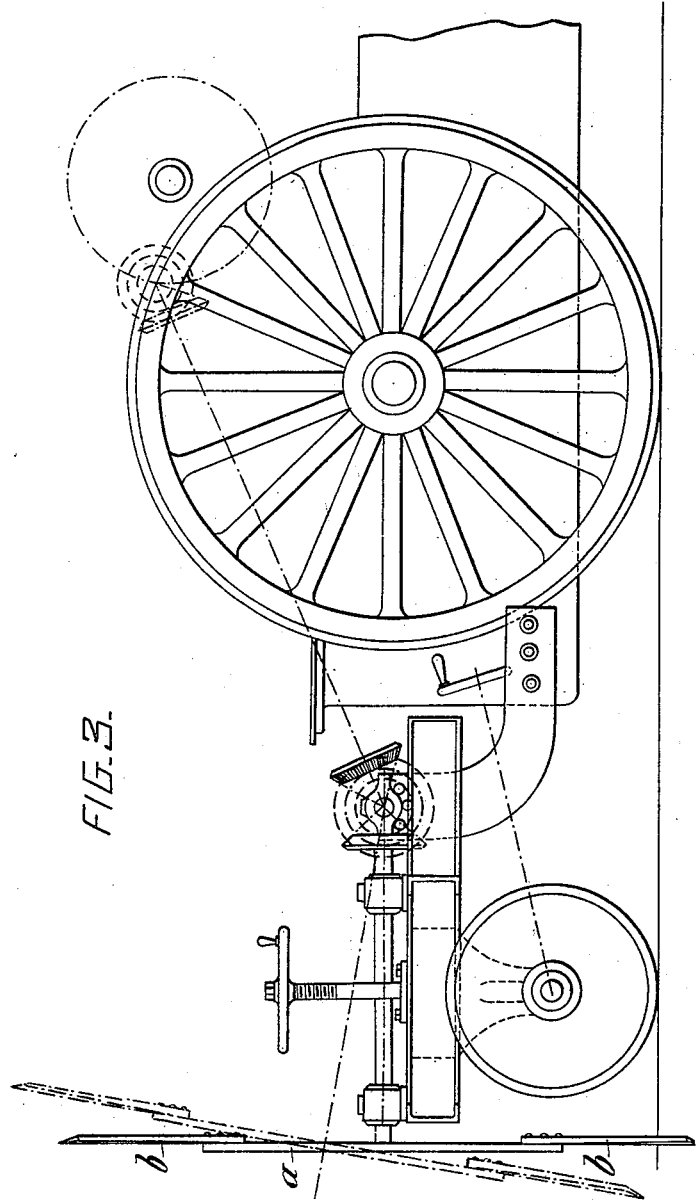

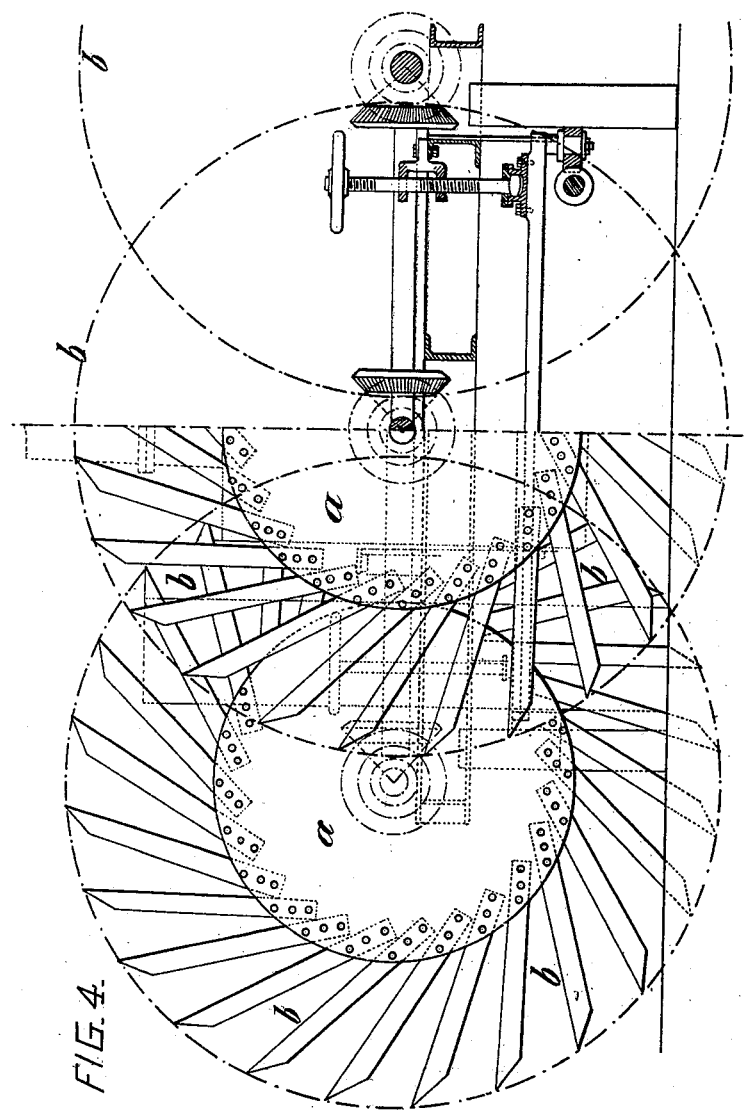

No. 658,460. Patented Sept. 25, 1900.
B. P. NUBAR.
MACHINE FOR PLOWING AND CULTIVATING.
(Application filed Mar. 4, 1899.)
(No Model.) 5 Sheets—Sheet 5.

UNITED STATES PATENT OFFICE.

BOGHOS PACHA NUBAR, OF CAIRO, EGYPT.

MACHINE FOR PLOWING AND CULTIVATING.

SPECIFICATION forming part of Letters Patent No. 658,460, dated September 25, 1900.

Application filed March 4, 1899. Serial No. 707,728. (No model.)

*To all whom it may concern:*

Be it known that I, BOGHOS PACHA NUBAR, a subject of the Turkish Empire, residing in the city of Cairo, Egypt, have invented Improvements in Machines for Plowing and Cultivating, of which the following is a full, clear, and exact description.

This invention relates to a rotary plow in which the plowing-tool is mounted upon a horizontal or slightly-inclined shaft and has a diameter greater than the depth of plowing, so as only to partially enter the ground and operate by its front face against a vertical working face of earth and not as in other types of rotary plows upon the horizontal surface of the ground.

The improved plowing-tool essentially comprises a disk mounted upon a horizontal shaft and carrying forwardly-working cutters which act on the soil in a horizontal direction in the manner of a boring-machine, whereas other types of rotary plows penetrate the soil in the manner of a dispersing-tool.

Reference is to be had to the accompanying drawings, wherein—

Figure 1 shows face and edge views of a rotary tool provided with colters or scrapers. Fig. 2 shows similar views of a tool having concentric forwardly-projecting cutters, Figs. $2^a$, $2^b$, $2^c$, and $2^d$ being enlarged detail views of the cutters. Fig. 3 is a side elevation of a machine provided with a rotary cutter adapted to be hauled by a traction-engine. Fig. 4 is a half rear elevation and half transverse section of the same on line 1 2, Fig. 5. Fig. 5 is a plan of the machine.

Before commencing the plowing operation a trench is cut in the ground perpendicular to the direction of and of a depth equal to that of the furrow to be formed, into which the tool is lowered, so that the cutters will be in position in front of the approximately-vertical face of the ground in order to cut the furrow. Before the machine is advanced the tool should be set in motion, so that it shall be already rotating when it comes into contact with the ground, this condition being essential to the proper working of the machine. The tool in thus revolving against the face of the work produces a planing, scraping, or scratching action, whereby the earth is pulverized. The tool in thus acting has the advantage of acting on freshly-opened ground, which offers less resistance than the superficial crust, and also of attacking the subsoil without having to break the more resistant superficial crust.

My improved plowing-tool consists, essentially, of a cutter-carrying disk, similar to the face-plate of a lathe, bolted upon the rear end of a cutter-shaft and provided with holes by which to bolt thereto arms $b$, of various forms, equally spaced around and projecting beyond the circumference of the disk, the arms being readily replaceable by others of different form.

In the example shown in Fig. 1 the arms $b$ have cutting edges and form colters or scrapers, and instead of being fixed radially they are inclined, relatively to these radii, so that each cutting edge forms an acute angle with the tangent to the point of attachment of its arm, this inclination having for its object to lift out of the ground any stones which may be met with instead of forcing them down more deeply. Independently of this inclination in the plane of the circle itself the surface of the colters is inclined relatively to said plane at an angle which is proportioned to the rate of advancement of the plow. (See Fig 1, side view.)

In Fig. 2 the arms $b$, bolted to the disk $a$, are mere flat bars, which are not themselves sharpened into cutting edges. These bars are placed radially and carry perpendicularly to their plane small cutting-blades $c$, which cut into the vertical working face of the ground in front of them in moving concentrically about the axis of the tool. The bars though not in and of themselves cutters are nevertheless provided with cutting edges. These cutters, which work in the manner of a harrow placed in a vertical plane, are arranged upon said arms at varying distances from the center of rotation of said arms in order that all points of the working face to be plowed may be successively acted on during one complete revolution of the plowing-tool. These small cutters $c$ may have their cutting edges inclined to the arms which carry them instead of being perpendicular thereto, so as to throw out the stones. The cutters may be replaced by teeth similar to those of harrows or scarifiers, &c., according to the nature of the operation. The rotary motion of the tool being combined with a forward movement of the carriage, the cutting edges will always be in contact with the face of the work and exert a cutting or scraping action for a breadth and depth of cut proportionate to the diameter of the tool. The tools are keyed upon horizontal shafts mounted upon a carriage and are made of larger diameter than the depth required for the plowing, so that they only partially enter the ground. This arrangement permits of the cutter-shaft being free from the liability of becoming clogged by the plowed ground thrown up, and also of simplifying the transmission of motion from the engine to the tools and of enabling the latter to be driven directly. The tools are fixed at the rear ends of the cutter-shafts and carriage, so as to enable the traveling wheels to run on the unplowed ground, as hereinafter explained. The depth of the plowing may be varied at will without changing the tools by providing the carriage-frame with any suitable arrangement for raising or lowering the level of the cutter-shafts, according to the requirements, whereby the tools may be caused to penetrate and plow the soil to a greater or less depth. The variation in depth of cut may be obtained by slightly oscillating the carriage-framing upon an axis parallel to the wheel-axles. In this case the plane of the tools and the face of the work against which they act will be slightly inclined to the vertical, which, however, causes no inconvenience in working.

The machine would ordinarily comprise several cutters carried on parallel shafts placed at less distances apart than the diameter of the cutters, so that the cutters overlap and operate over the whole breadth of ground between the outside cutters. The tools of whatever kind being rotary necessarily cut in the soil furrows in the form of segments of a circle separated by small triangular ridges, which, owing to the overlapping of the cutters, do not extend up to the ground-surface and may generally be left. It may, however, be of advantage in some cases to break them down, and this may be done by means of a small subsoil-plow attached to the rear of the carriage behind the cutters, which will break them down easily, as they offer little resistance, being isolated and without lateral support. The distance between each pair of wheels—that is to say, the gage of the carriage—should be less than the breadth plowed by the gang of tools, so that the wheels being in front of the tools will run on unplowed ground. The power required to propel the machine will thus be less than if the wheels were to travel on the plowed land. The cutters may either rotate all in the same or in opposite directions, it being preferable to make one half the number work in one direction and the other half in the opposite direction, so as to balance straight as much as possible. In order to reduce the rate of forward travel and to work over a greater breadth of ground at one time, the number of tools may be increased, so as to reduce the penetration of the tools in the face of the work and increase the amount of plowing-work done. The rate of advance of the machine and the speed of rotation of the tools should be so proportioned as to reduce the loss due to the friction of the cutters, the rate of advance depending upon the angle of inclination of the cutting edges of the tools. The advance of the machine is produced either by operating the driving-wheels directly by the engine or when the weight of the plow is insufficient to obtain enough adhesion by hauling it by means of a rope, cable, or other means of traction anchored at one end of the field and winding upon a drum mounted upon the frame of the machine, or for machines of small dimensions simply by animal traction.

I will now describe the mode of driving the tools.

According to the arrangement illustrated in Figs. 3, 4, and 5 the plow is hauled by an ordinary traction-engine, in which case the plow has no engine upon it, the motive power for driving the tools being supplied by the traction-engine, which at the same time hauls the plow. The cutter-carrying disks $a$ are keyed on the ends of horizontal shafts, which are driven by means of bevel-gear through a cross-shaft driven from the traction-engine through an intermediate shaft. The several shafts are mounted in bearings upon the plow-frame, which may be inclined more or less by means of lifting-screws, so as to regulate the depth of penetration of the tools in the soil.

It is to be understood that the driving mechanism is described merely by way of example and that it may be modified according to circumstances, as well as the form and dimensions of the cutters.

I claim—

1. In a plowing apparatus, the combination of a carriage, a substantially-horizontal shaft with means for driving the same and a disk or carrier provided with arms having forwardly-projecting blades provided with cutting edges, substantially as described and for the purposes set forth.

2. In a plowing apparatus, the combination of a carriage, a substantially-horizontal shaft with means for driving the same and a disk or carrier provided with arms having forwardly-projecting blades provided with cutting edges, the said blades being arranged upon adjacent arms at varying distances from the center of rotation of said arms, substantially as described and for the purposes set forth.

3. In a plowing apparatus, the combination of a carriage, a substantially-horizontal shaft carried by the said carriage and extending longitudinally in the direction of movement of the said carriage, a disk or carrier carried by the said shaft and having arms projecting beyond the periphery thereof and provided with cutting edges located in a vertical plane so as to execute their cut only in a plane substantially at right angles to the axis of the shaft.

4. In a plowing apparatus, the combination of a carriage, a substantially-horizontal shaft carried thereby, the said shaft extending longitudinally in the direction of movement of the carriage, and cutting edges supported by the said shaft and located in a vertical plane so as to execute their cut in a plane substantially at right angles to the direction of movement of the carriage.

The beforegoing specification of my improvements in machines for plowing and cultivating signed by me this 30th day of January, 1899.

BOGHOS PACHA NUBAR.

Witnesses:
EDWARD P. MACLEAN,
MAURICE HENRI PIGNET.